(No Model.)

O. R. RUFUS.
BRUSH CUTTING MACHINE FOR VINEYARDS.

No. 314,979. Patented Mar. 31, 1885.

WITNESSES
Jno. L. Taggard
Saml. E. Watson

INVENTOR
Otto R. Rufus
by E. E. Osborn
atty.

UNITED STATES PATENT OFFICE.

OTTO R. RUFUS, OF SONOMA, CALIFORNIA.

BRUSH-CUTTING MACHINE FOR VINEYARDS.

SPECIFICATION forming part of Letters Patent No. 314,979, dated March 31, 1885.

Application filed January 19, 1884. (No model.)

*To all whom it may concern:*

Be it known that I, OTTO R. RUFUS, a citizen of the United States, residing in Sonoma, county of Sonoma, State of California, have made and invented certain new and useful Improvements in Brush-Cutting Machines for Vineyards; and I do hereby declare that the following is a full, clear, and exact description of my said invention, and of the manner in which I proceed to construct, apply, and use the same.

The object of my invention is to provide a machine or mechanical means for cutting up the refuse trimmings and cuttings of vines as they lie on the ground in the yard or field in order to reduce them to small pieces for purposes of manure. Heretofore it has been the practice in vineyards more particularly to cut up the refuse product of the pruning and trimming operations by the use of hand implements only; but this mode of dealing with the stuff is too expensive for use in large vineyards and operations on an extensive scale, and therefore I have devised and produced a machine for accomplishing the desired object in a rapid and economical manner.

My invention consists in fixing, mounting, and operating a series of cutting-knives within a frame, to which a progressive movement or travel along and over the ground is given by the attachment to its front end of suitable draft power. The knives or cutters have a vertical position and are vibrated through the medium of suitable mechanism actuated by or from the draft-wheels of the machine with a motion and a line of cut practically coinciding with the progression of the machine and in a vertical plane. Suitable means in connection with the frame are provided for regulating the position of the knives or cutters with respect to the surface of the ground over which the machine is drawn, so that they may be raised clear of the ground or adjusted to run in suitably close position thereto.

In carrying out my said invention I proceed to construct a machine substantially after the following manner, the accompanying drawings being referred to throughout the description by figures and letters.

Figure 1:
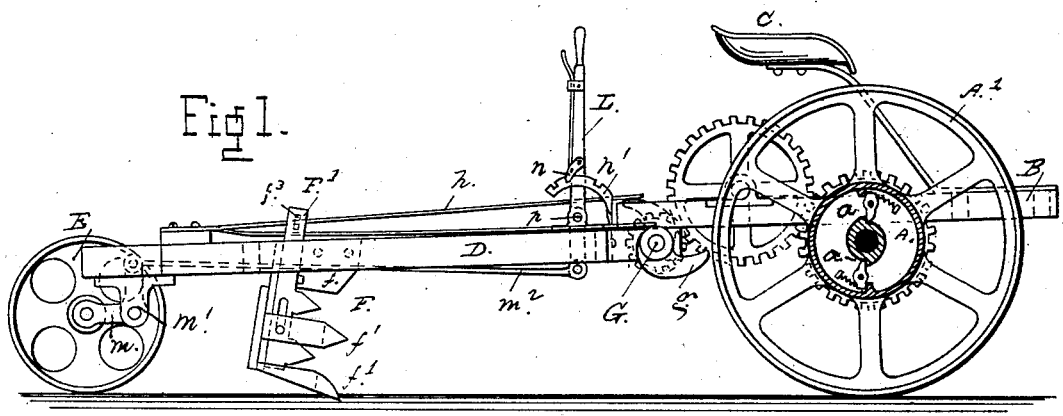
Figure 2:
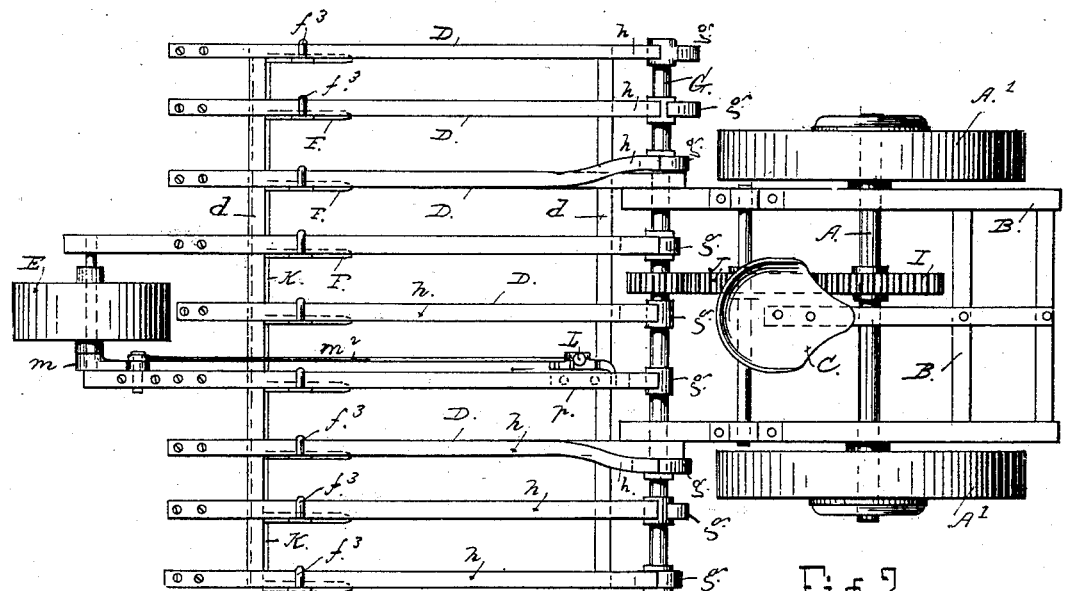
Figure 3:
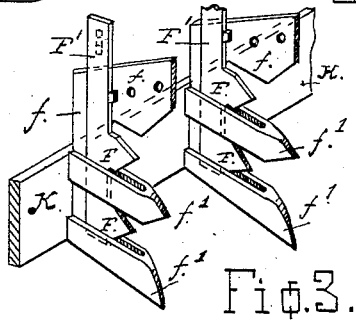

Figure 1 of the drawings represents a side elevation of my improved machine; Fig. 2, a plan, and Fig. 3 a detail, of the cutters.

A is an axle, having the draft-wheels A' A' connected to it by clutches $a$ $a$ after the usual manner of attaching the wheels of mowers and reapers, in order to allow backward movement of either wheel independent of the axle.

B B is a frame mounted on the axle, and having a seat, C, for the driver, and a connection at the front for a tongue or shafts.

A frame, composed of longitudinal bars D and cross-bars $d$ $d$, is hinged or loosely connected at $d'$ $d'$ to the axle-frame, and at the rear end is provided with a caster-wheel, E. Its position is an inclined or slanting one, so that the rear ends of the longitudinal bars are brought nearer to the ground than the front ends. Each bar carries a cutter composed of a guide-plate, $f$, which is bolted fast to the side of the bar, and has projecting points or fingers $f'$, similar to those of the sickle-bar in a mowing-machine, and a reciprocating cutter or knife, F, that is fixed to or is part of a shank, F'. Vertical reciprocating movement is given to such cutter by means of a cam, $g$, on a shaft, G, and a long spring-arm, $h$, fixed at one end to the frame and at the other end riding on the cam. The spring works through a slot or a loop, $f^3$, on the end of the shank F', and by its reaction gives downward movement to the cutter, while the cam gives the upward movement. The bar or shank has two knives or cutting-blades, and works in the groove or slot provided in the finger-bar, the knives having double cutting-edges, so that they cut on both the up and the down stroke.

The cam-shaft is rotated from the axle through the medium of gearing I J, and the cams are set one ahead of the other, so as to give alternate action of the several cutters of the frame, instead of simultaneous action. The cutters have vertical position and movement, and are arranged in a row across the frame at regular distances apart immediately in front of a tail-board or apron, K, that is fixed across the frame behind the bars in such position that the open spaces between the bars are closed, and the lower edge is in close relation with the surface of the ground when the frame is set down for work.

The caster-wheel is fixed in crank-bearings $m$, the centers of which are mounted in boxes $m'$, secured to the under side of the longitudinal bars of the frame. These cranks are moved and set by means of a hand-lever, L, on the upper end of the frame, having a fulcrum at $p$, and connected at the lower end to the upright member of the crank by a rod, $m^2$. Position of the lever is maintained by a locking-pawl, $n$, on the side of the lever, and a notched segment, $n'$, fixed on the frame.

The draft-wheels A are loose on the axle, and are connected by means of clutches $a\ a$ to engage with it only on the forward movement of the machine. This construction is already in general use upon agricultural machinery where power is obtained from the draft-wheels of a machine to operate the devices and mechanisms thereof, and therefore it is not claimed as a novel point of this invention. The same result can be obtained by connecting the driving-gear I with the axle by a clutch, so that no movement of the cutters will be produced in backing the draft-team.

In the operation of this machine the rear wheel is set in position to bring the cutters close to the ground, so that the lowermost fingers of the bars take into the soil and the edge of the apron K runs close to the surface. This adjustment is effected by the driver before taking his seat, and its degree will be determined by the character of the surface over which the machine is to be drawn. In its progress between the rows of plants the brush and other refuse matter resulting from the trimming and pruning operations is caught by the cutters and reduced to short pieces. Whatever pieces of such matter are lying longitudinally, or in such position that they would if not disturbed pass between the cutter-bars, are caught by the apron K, and being thus drawn along by it are caused to work around and be turned crosswise of the frame, so that the cutters shall finally seize them. The work of reducing such matter into a condition suitable to readily work into the ground as a fertilizing agent, and to clean up the spaces between the rows as well, is quickly and economically performed by one man with such a machine.

Having thus fully described my invention, what I claim, and desire to secure by Letters Patent, is—

1. In a machine for cutting brush, a series of horizontal or approximately horizontal arms capable of being tilted, each carrying a vertically-operating cutter, in combination with said cutters and with the mechanism for operating them, as set forth.

2. In a machine of the character hereinbefore described, the combination of a draft-axle, A, a shaft, G, receiving motion therefrom, the frame having cutters that are set to operate in substantially vertical planes, the spring-arms $h$, and the cams $g$ on the shaft G, as a means of giving a cutting movement to the cutters in both directions, as set forth.

3. The combination, with the cutters, of the apron K, substantially as hereinbefore described, for the purpose set forth.

4. The hereinbefore-described traveling brush-cutting machine, consisting, essentially, of a draft-frame mounted on wheels, a trailing frame composed of bars D, having vibrating cutters that move in substantially vertical planes, a means for setting and supporting the rear end of the frame with respect to the surface of the ground, an actuating-shaft to which each cutter is connected by mechanism that produces the required vibratory motions thereof, and mechanism connecting said shaft with the draft-axle, substantially as hereinbefore set forth.

Witness my hand and seal.

OTTO R. RUFUS. [L. S.]

Witnesses:
ROBERT A. POPPE,
FRED. DUHRING.